UNITED STATES PATENT OFFICE.

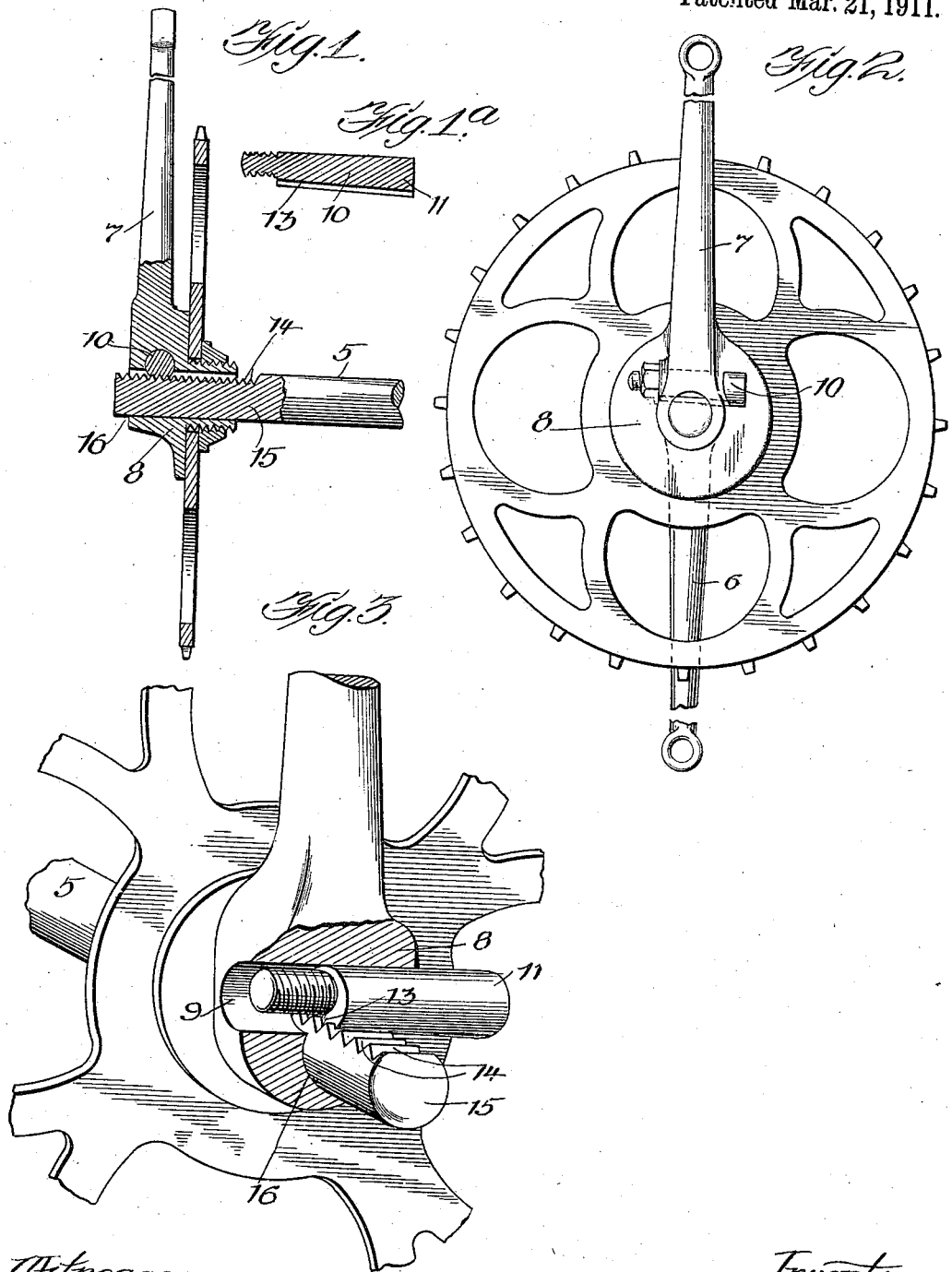

CHARLES L. JENNESS, OF CHICAGO, ILLINOIS.

ADJUSTABLE CRANK-HANGER.

987,370. Specification of Letters Patent. Patented Mar. 21, 1911.

Application filed January 25, 1910. Serial No. 539,980.

*To all whom it may concern:*

Be it known that I, CHARLES L. JENNESS, a citizen of the United States, residing at Chicago, in the county of Cook and State of Illinois, have invented certain new and useful Improvements in Adjustable Crank-Hangers, of which the following is a specification.

This invention is designed more particularly for use in bicycle repairing, although it is not the intention to limit the invention strictly to this field.

In the construction of bicycles it frequently happens that the different makers employ crank hanger brackets of different widths, which serves to vary the distance between the crank arms, with resulting differences in the lengths of crank shafts employed. In repairing bicycles having crank shafts of different lengths, difficulty and delay are often experienced by reason of the fact that the repair man is unable to furnish a shaft of the proper length to fit the hanger bracket of the bicycle undergoing repairs, and this frequently necessitates the procuring of new parts from the original maker, which is usually inconvenient, and sometimes impossible.

The object of the present invention is to obviate the difficulties above mentioned by providing a crank shaft of a maximum length, which can be cut down to suit particular requirements, and the invention more particularly relates to the means for fastening the crank arms to a shaft of this character at the proper points to accommodate the width of the hanger bracket.

Further objects will appear from a detailed description of the invention, which consists in the features of construction and combination of parts hereinafter described and claimed.

In the drawings, Figure 1 is a view partly in section, showing the end of the crank shaft with the associated parts; Fig. 1ª, a longitudinal sectional detail of the wedge cotter pin which coöperates with the shaft; Fig. 2, a side elevation of the sprocket wheel and crank arm, showing the end of the shaft and the cotter pin driven to place; and Fig. 3, a perspective detail, partly in section and enlarged, showing the method of driving the cotter pin.

It will be understood that the parts particularly relating to the present invention are used in connection with a hanger bracket of tubular or cylindrical formation, through which a shaft 5 extends. The length of this tubular bracket varies, as above explained, so that it is desirable that the shaft 5 should be of a maximum length adaptable to hanger brackets of all widths. The shaft coöperates with a pair of crank arms 6 and 7, the former of which may be integral with or attached to the adjacent end of a shaft in any usual and well known manner. Obviously, it is necessary to provide a variable attachment for only one end of the shaft in order to adjust the distance between the two crank arms. The present invention is concerned particularly with the means provided for making the attachment of the crank arm 7 at the required distance from the crank arm 6.

The crank arm 7 is provided, at its inner end, with a head 8, having formed therein a transversely extending cotter pin hole 9, adapted to receive a cotter pin 10. The cotter pin in the form shown in Fig. 1ª, at its outer end 11, is of a substantially cylindrical formation, and the cotter pin is provided in one of its faces with a plurality of longitudinally extending grooves 12, which furnish a plurality of intermediate teeth 13. The pin is tapered down on its toothed side to reduce its thickness at its inner end compared with the thickness of the outer end. The longitudinally extending teeth in the cotter pin coöperate with transversely extending teeth 14 formed in the relatively flattened end 15 of the shaft 5, which end extends through a hole 16 formed in the head of the crank arm 7. As shown in Fig. 2, the cotter pin hole coincides partially with the shaft hole, so that when the cotter pin is driven to place, the teeth of the cotter pin will engage with the teeth of the shaft, and this engagement will increase as the cotter pin is driven to place by reason of the wedge action, due to the taper formation of the cotter pin.

It is not the intention to limit the invention to the use of a cotter pin of the generally cylindrical formation heretofore described, since the cotter pin might be of other than cylindrical formation in cross section. It will furthermore be understood that it is not the intention to limit the invention as regards the method of securing the wedging action, since this action can obviously be secured in ways other than that specifically described.

In use, when it is desired to repair a bicycle by substituting a new crank shaft, the shaft 5 with the crank arm 6 will be projected through the usual journal ball bearings carried by the hanger bracket, until the crank arm 6 and the adjacent end of the shaft are seated and in their proper place. This will cause the other toothed end of the shaft to project outwardly beyond the opposite end of the hanger bracket a greater or less distance, depending upon the width of the hanger bracket. And when the parts are thus positioned, the crank arm 7 will be slipped to place and the cotter pin driven, after which the projecting portion of the shaft can be cut away and discarded. The invention is one which permits the adjustment to be made very quickly, by reason of the fact that the crank arm can be almost instantly slipped to place, without the necessity of employing screw threads, jam nuts, or the like, in making the adjustment. The engagement of the teeth of the cotter pin with the teeth on the shafts prevents both longitudinal and rotary movement of the crank arm around the shaft, and the wedge-like formation of the cotter pin enables it to be driven to place in a manner to firmly and permanently secure the parts together.

I claim:

1. In an adjustable crank hanger, the combination of a shaft, flattened on one side at one of its ends said end being threadless, a crank arm provided with a hole for receiving the flattened threadless end of the shaft and provided with a cotter pin hole partially coinciding with the first mentioned hole, and a cotter pin provided with longitudinally extending teeth, adapted to enter grooves in the face of the flattened end of the shaft, the flattened face of the shaft being provided with transversely extending teeth and intermediate grooves, substantially as described.

2. In an adjustable crank hanger, the combination of a shaft, flattened on one side at one of its ends said end being threadless, a crank arm provided with a hole for receiving the flattened threadless end of the shaft and provided with a cotter pin hole partially coinciding with the first mentioned hole, and a cotter pin provided with teeth extending slightly diagonally with respect to the axis of the pin, to constitute a wedge, said teeth being adapted to enter grooves in the face of the flattened end of the shaft, the flattened end of the shaft being provided with transversely extending teeth and intermediate grooves, substantially as described.

3. In an adjustable crank hanger for bicycles, the combination of a shaft, provided at one end with a crank arm secured at a fixed point to the shaft, and flattened at its other end on one of its faces said latter end being threadless, a crank arm provided with a hole adapted to receive the flattened threadless end of the shaft and provided with a cotter pin hole extending transversely with respect to the shaft hole and partially coinciding therewith, and a cotter pin provided with teeth on one side adapted to enter grooves on the surface of the shaft when the cotter pin is driven to place, the shaft being provided with transversely extending teeth and intermediate grooves, substantially as described.

CHARLES L. JENNESS.

Witnesses:
 THOS. A. BANNING, Jr.,
 SAMUEL W. BANNING.

Copies of this patent may be obtained for five cents each, by addressing the "Commissioner of Patents Washington, D. C."